United States Patent
Rzeznik et al.

(10) Patent No.: US 9,863,044 B2
(45) Date of Patent: Jan. 9, 2018

(54) METHOD FOR ELECTROLESS METALLIZATION

(71) Applicant: Rohm and Haas Electronic Materials LLC, Marlborough, MA (US)

(72) Inventors: Maria Anna Rzeznik, Shrewsbury, MA (US); Philip D. Knudsen, Northborough, MA (US); Xuesong Wang, Fanling (HK); Martin W. Bayes, Hopkinton, MA (US); Yuhsin Tsai, Hsinchu (TW)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 108 days.

(21) Appl. No.: 14/042,527

(22) Filed: Sep. 30, 2013

(65) Prior Publication Data

US 2014/0093647 A1     Apr. 3, 2014

Related U.S. Application Data

(60) Provisional application No. 61/708,030, filed on Sep. 30, 2012.

(51) Int. Cl.
| | |
|---|---|
| *B05D 3/10* | (2006.01) |
| *C23C 18/18* | (2006.01) |
| *C09D 179/02* | (2006.01) |
| *C23C 18/16* | (2006.01) |
| *C08G 12/00* | (2006.01) |
| *C23C 18/40* | (2006.01) |

(52) U.S. Cl.
CPC ............ *C23C 18/18* (2013.01); *C09D 179/02* (2013.01); *C23C 18/165* (2013.01); *C23C 18/1893* (2013.01); *C08G 12/00* (2013.01); *C23C 18/1651* (2013.01); *C23C 18/1653* (2013.01); *C23C 18/40* (2013.01)

(58) Field of Classification Search
USPC ......... 427/372.2, 385.5, 487, 522, 304, 305, 427/306, 443.1
See application file for complete search history.

(56) References Cited

U.S. PATENT DOCUMENTS

| | | | | |
|---|---|---|---|---|
| 3,929,698 | A * | 12/1975 | Hudson | ................. C08F 283/01 523/500 |
| 5,606,010 | A * | 2/1997 | Erhan | .................... C08G 12/00 528/125 |
| 6,759,488 | B1 * | 7/2004 | Sellergren et al. | ............. 526/67 |
| 2008/0149566 | A1 | 6/2008 | Messersmith et al. | |
| 2009/0269561 | A1 * | 10/2009 | Kano et al. | ................... 428/209 |
| 2010/0021748 | A1 * | 1/2010 | Hu et al. | ...................... 428/458 |

OTHER PUBLICATIONS

H. Lee et al.; "Mussel Inspired Surface Chemistry for Multifunctional Coatings"; Science, vol. 318, No. 5849; Oct. 19, 2007; pp. 426-430.
Davis J. et al.; "Modification of catechol polymer redox properties during electropolymerization in the presence of aliphatic amines"; Electrochimica Acta, Elsevier Science Publishers, Barking, GB; vol. 43, No. 3-4; Jan. 1, 1998; pp. 291-300.
Nithianandam V. S. et al.; "Quinone-amine polymers: 10. Use of calcium hypochlorite in the syntheses of polyamine-quinone (PAQ) polymers"; Polymer, Elsevier Science Publishers B.V., GB; vol. 32, No. 6; Jan. 1, 1991; pp. 1146-1149.

* cited by examiner

*Primary Examiner* — Dah-Wei D. Yuan
*Assistant Examiner* — Nga Leung V Law
(74) *Attorney, Agent, or Firm* — John J. Piskorski

(57) ABSTRACT

A method for forming a polymerized film on a surface of a non-conductive material and subsequently forming an electroless metal plating film on the surface is described. The method includes the step of contacting the surface of the material with a solution including (A) an amine compound having at least two functional groups, where at least one of the functional groups is an amino group, and (B) an aromatic compound having at least one hydroxyl group on the aromatic ring.

2 Claims, 3 Drawing Sheets

METHOD FOR ELECTROLESS METALLIZATION

FIELD OF THE INVENTION

The presently disclosed embodiments relate generally to a method for forming a polymerized film on a surface of a non-conductive material and subsequently forming a metallic film on the surface without the aid of a traditional conditioner. More particularly, the embodiments relate to a method for forming an electrolessly plated metal film with strong adhesion on a smooth surface of non-conductive material without the aid of a traditional conditioner, using the polymerized film.

BACKGROUND OF THE INVENTION

Electroless metallization (or electroless plating) is a method for obtaining a thin metallic film on materials such as metals, ceramics or plastics by a series of process steps, including the use of a conditioner, microetch, catalyst (activation) and electroless plating bath. The mostly popular catalysts for electroless plating during the past 30 years are Pd/Sn colloids in which palladium colloidal particles are stabilized by tin chloride. Prior to electroless plating, the surface charge of a dielectric substrate is typically negative. Due to electrostatic repulsion, the negative charge on the substrate will typically inhibit the adsorption of catalyst which is a negative charged colloid. The initiation of electroless metallization can be difficult if there is insufficient catalyst adsorption. In order to improve catalyst adsorption, a traditional conditioner step is often used. Typical constituents of a traditional conditioner include cationic surfactants, which provide positively-charged groups to change the substrate from negatively to partially positively charged, so that the adsorption of the catalyst can be improved. In other words, the interaction between the substrate and the catalyst is enhanced by a traditional conditioner via electrostatic attraction.

The reliability of circuits relies heavily on the adhesion between the deposited metal layer and the dielectric substrate. Poor adhesion may lead to unacceptable failures, such as "peel-off" or blistering. The electrostatic attraction from the traditional conditioner may not be strong enough to build up sufficient adhesion between the deposited metal layer and the dielectric substrate. Roughening the surface of dielectric substrates, for example by using a de-smear process, is often performed before electroless plating to increase the metal adhesion. Sufficient adhesion between the deposited metal layer and the dielectric substrates is then provided by the roughness of the dielectric substrate. Good adhesion is more difficult to obtain on a smooth surface using such process flows.

As L/S for next generation chip carriers get smaller, there is a need for smoother surfaces to etch fine lines. As the width and space of signal traces continue to shrink, and the frequency of the signals continues to increase, the surface of the insulating materials need to be smoother. Achieving high adhesion of a metallized layer on low profile insulating materials becomes increasingly difficult. Traditional etching-type processes to improve adhesion are no longer feasible, thus an alternative method is needed to improve the adhesion of fine patterned circuits on insulating materials. There is a need for improvements on traditional roughening processes and development of novel approaches to attain high adhesion of metal to polymer on a smooth surface for finer line chip carriers. In order to meet the requirements of the electronics industry for fine line circuits, a conditioner needs to be capable of providing high adhesion to a smooth (low profile) surface, as well as modifying the surface charge of dielectric substrates to improve the adsorption of a negatively charged catalyst.

Marine mussel organisms are known for their ability to bind strongly to such varied surfaces as rocks, pilings, and ship hulls. The adhesive characteristics of mussel adhesive proteins are believed to be due to the presence of 3,4-dihydroxyphenylalamine (DOPA). P. B. Messersmith et al. SCIENCE, 2007, Vol 318, page 426-430 discloses the use of dopamine to mimic the ability of mussel's adhesive protein to adhere to a surface of materials. Via a self-polymerization process, a thin, surface-adherent polydopamine film can be formed onto a wide range of inorganic and organic substrates through simple dip-coating of these substrates in an aqueous solution of dopamine at room temperature for 24 hours. Electroless silver or copper deposition was performed on the polydopamine coated surfaces to form a layer of silver or copper. CN10182678A discloses a polydopamine-assisted electroless silver process, in which dip coating of dopamine for 0 to 48 hours at room temperature was used. US2010/0021748A discloses a process comprising the steps of treating a substrate with a catecholamine solution including dopamine, to form a polycatecholamine layer followed by electroless plating.

Reviewing the prior art for dopamine-aided electroless plating, it can be found that the dopamine self-polymerization process typically requires room temperature treatment for about 24 hours. Coupled with the relatively high cost of dopamine, the long dwell time of dopamine treatment is a barrier to commercial application. In addition, the pH range that is suitable for the self-polymerization of dopamine is quite narrow (6.5-9.5). Outside this pH range, the self-polymerization rate of dopamine becomes extremely low.

SUMMARY OF THE INVENTION

The inventors of this invention have found a method to form a multi-functional polymer film on a smooth surface through simple dip-coating of a material in a solution comprising two specific chemicals. The resulting film allows for electroless metallization, without the aid of a traditional conditioner, with enhanced adhesion between the deposited metal layer and the material. This is especially suitable for a dielectric substrate with a smooth surface.

According to aspects illustrated herein, there is provided a method for forming a thin, polymerized, surface-adherent polymer film onto a wide range of inorganic and organic substrates thorough contacting such materials with a solution comprising (A) an amine compound having at least two functional groups, where at least one of the functional group is an amino group and (B) an aromatic compound having at least one hydroxyl group on the aromatic ring. Another aspect of this invention is a method to form a polymerized film described above, comprising the step of contacting the surface of the material with a free radical initiator solution prior to the step contacting the material with the solution comprising (A) and (B) above. A further aspect of this invention is a method for forming an electrolessly plated film on a smooth surface of a non-conductive material with strong adhesion, without the aid of a traditional conditioner using the above polymerized film.

DETAILED DESCRIPTION OF THE INVENTION

Figure 1:
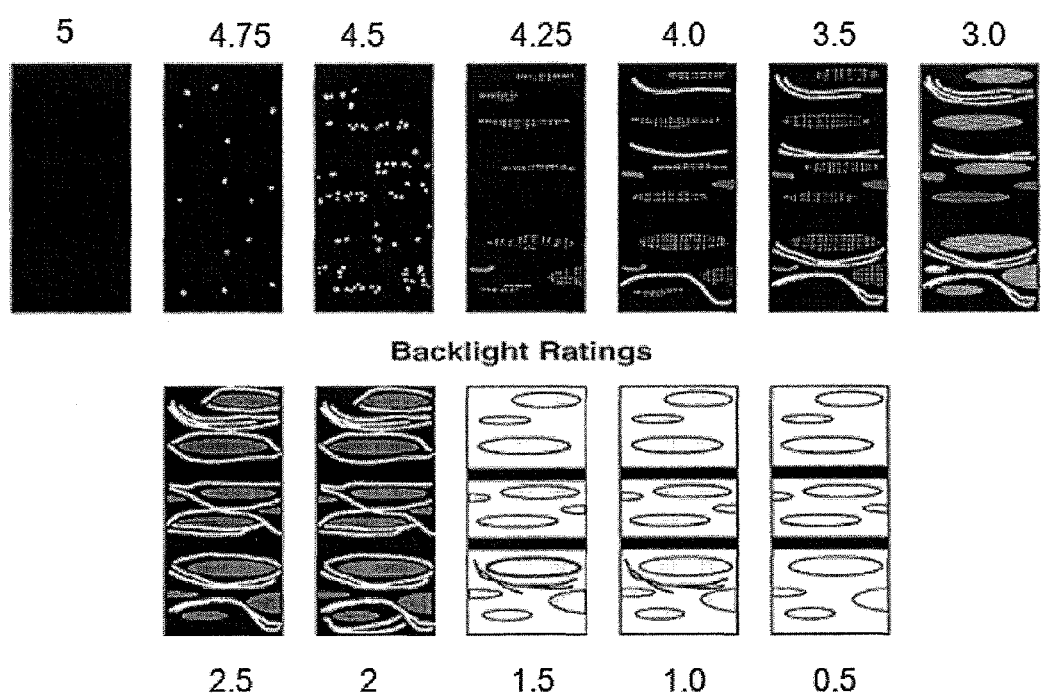
FIG. 1 is a series of standard images for back light rating assessment.

As used throughout this specification, the abbreviations given below have the following meanings, unless the content clearly indicates otherwise: g=gram; mg=milligram; mL=milliliter; L=liter; m=meter; min.=minute; s=second; h.=hr.=hours; ppm=parts per million; mol=mole; mmol/L=milli-mole per liter; g/L=grams per liter; R.O.=Reverse Osmosis; RT=room temperature; Ex. No.=Example number; lb/in=pound per inch. As used throughout this specification, the word "deposition" and "plating" are used interchangeably. As used throughout the specification, the word "plating bath" and "plating solution" are used interchangeably.

The method includes the step of contacting a surface of a material with a solution comprising (A) an amine compound having at least two functional groups, where at least one of the functional group is an amino group and (B) an aromatic compound having at least one hydroxyl group on the aromatic ring.

(A) Amine Compounds

Amine compounds of this embodiment are those compounds having at least two functional groups, where at least one of the functional groups is an amino group. The functional groups can be selected from any kind of functional group, even if the compound can react with (B) the aromatic compounds described in detail later. Examples of such functional groups include, but are not limited to, amino groups and phenolic hydroxyl groups. Preferably, the other functional groups are amino groups. Amino groups include primary amino groups, secondary amino groups, and nitrogen containing heterocyclic groups. Amine compounds can be aliphatic compounds or aromatic compounds. When chemical resistance of the polymerized film is required, an aromatic amine such as tyramine is preferably used. When flexibility is required, an alkyl diamine having longer carbon chain such as hexamethylene diamine (HMDA) is preferably used.

Examples of amine compounds are disclosed in formula 1a to formula 7a:

$$H_2N-R_1-NH_2 \quad \text{Formula 1a}$$

wherein $R_1$ is selected from the group consisting of $C_1$ to $C_{24}$ linear or branched alkylene and aromatic alkylene.

$$H_2N-R_1-NH-R_2-NH_2 \quad \text{Formula 2a}$$

wherein $R_1$ and $R_2$ are selected independently from the group consisting of $C_1$ to $C_{24}$ linear or branched alkylene and aromatic alkylene.

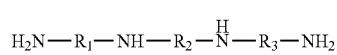

wherein $R_1$, $R_2$, and $R_3$ are selected independently from the group consisting of $C_1$ to $C_{20}$ linear or branched alkylene and aromatic alkylene.

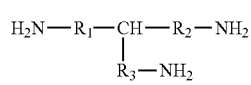

wherein $R_1$, $R_2$, and $R_3$ are selected independently from the group consisting of $C_1$ to $C_{20}$ linear or branched alkylene and aromatic alkylene.

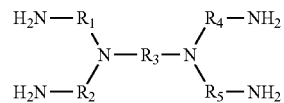

wherein $R_1$, $R_2$, $R_3$, $R_4$, and $R_5$ are selected independently from the group consisting of $C_1$ to $C_{16}$ linear or branched alkylene and aromatic alkylene.

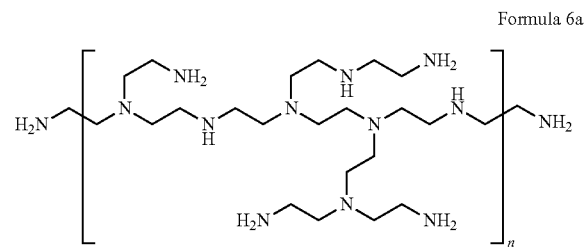

wherein n is an integer from 1 to 1500.

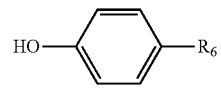

wherein $R_6$ is selected from the group consisting of

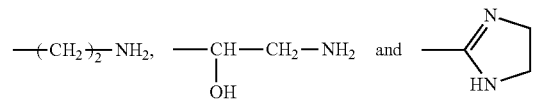

Amine compounds can be used as a mixture of two or more kinds of amine compounds. The amount of (A) amine compounds in the solution is 2 mmol/L to 2000 mmol/L, preferably 10 mmol/L to 400 mmol/L.

(B) Aromatic Compounds

Aromatic compounds of this embodiment have at least one hydroxyl group connected to an aromatic ring. Preferably, the aromatic compounds have two hydroxyl groups; more preferably, they may have two hydroxyl groups at ortho or para position to each other. Aromatic compounds can be phenyl, naphthyl, or any other aromatic compounds. The preferable aromatic compound is a phenyl compound.

While not wishing to be bound by theory, it is believed that a hydroxyl group connected to an aromatic ring such as catechol is oxidized and the aromatic compound is converted to a quinone. Since the oxygen atom of quinone is an electron-withdrawing group, quinone has activated carbon atoms on the aromatic ring. Michael Addition may occur at the activated carbon atoms on the aromatic ring with the amino group of the amine compound, and the amine compound and the aromatic compound are combined. The inventors have found that the copolymerization rate of diamine with resorcinol with two hydroxyl groups at meta-position or phenol with one hydroxyl group at room temperature is slower than that of catechol or hydroquinone with two hydroxyl groups at ortho-position and para-position, respectively. Therefore, it is believed that compounds with two hydroxyl groups at the ortho- or para-position may be easier to form ketone groups and undergo a Michael Addition reaction with amine compounds than that with two hydroxyl groups at meta-position.

Examples of aromatic compounds are disclosed in formula 1b:

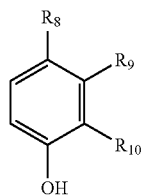

Formula 1b wherein $R_8$ is selected from the group consisting of H, $CH_3$, OH, phenyl, CN, $NO_2$, propanoic acid, ethylamine, formic acid and formaldehyde, $R_9$ and $R_{10}$ are independently selected from H and OH.

A mixture of aromatic compounds can be used. The amount of (B) aromatic compounds in the solution is 2 mmol/L to 2000 mmol/L, preferably 10 mmol/L to 400 mmol/L.

The medium of the solution is preferably water. RO water or de-ionized water can be used. A mixture of water with organic solvents such as methanol, ethanol, propanol, ethylene glycol, propylene glycol, propylene glycol or tetrahydrofuran may also be used as the medium of this invention.

When dipping a material in a solution including (A) and (B), a film is formed on the surface of the material. It is believed that the film is a copolymerized film of (A) with (B) via Michael Addition between (A) and (B), as well as coupling between (B) and (B) or (B) and (A). In the case of organic materials, chemical bonds between the organic surfaces and the copolymer(A+B) film might be formed via free radical or Michael Addition reactions. In the case of inorganic material, coordination bonds between the inorganic surfaces with the copolymer(A+B) film might be built up via coordination reaction.

To synthesize a film on a surface of a material, the mole ratio of the functional groups within (A) to the functional groups within (B) in the solution may vary such as 10:1 to 1:10. However, when the polymerized film is used for electroless plating techniques, the preferable mole ratio depends on the required properties of the film and the functionality on (A) and (B).

Amino groups potentially possess positive charges, whereas hydroxyl groups on aromatic rings potentially possess negative charges. By control of the mole ratio of amino groups to hydroxyl groups, the charge distribution of the polymerized film can be modified. For example, when a negative charged catalyst such as a Pd/Sn colloid is used in the process of electroless deposition, a positively charged copolymer(A+B) film is preferred because of better adsorption of a negatively charged catalyst. Therefore, when the polymerized film is used for an electroless plating process using a Pd/Sn colloid catalyst such as in the current industrial electroless plating techniques, and when (A) is a diamine compound and (B) is a di-hydroxyl phenyl compound such as catechol, the preferable mole ratio of (A) to (B) varies from 4:1 to 1:1, more preferably is 2:1. On the other hand, if a positively charged catalyst is developed and used, a negatively charged copolymer(A+B) film might be preferred.

When the process of electroless plating does not have a catalyzing step and metal deposition is conducted directly, the key influence of the copolymer(A+B) film on the electroless plating process will be its reducibility, rather than its electric charge. Higher reducibility of the copolymer(A+B) film will result in shorter time to initiate electroless plating. Therefore, when the polymerized film is used for an electroless plating process without a catalyzing step, (A) and (B) should be selected so that the reducibility of the film becomes higher, consequently, the adhesion between the deposited metal and the dielectric substrate will be improved by the existence of the copolymer(A+B) film.

The step of contacting a surface of a material with a solution comprising (A) and (B) is conducted via any kind of methods, such as dipping or spraying.

The temperature range for contacting a material with the solution is from 5 to 99 degree C. The dwell time of contacting a material with the solution depends on the temperature of the solution. When the temperature is around room temperature, the time for contacting a material with the solution is preferably 3 hours to 3 days, more preferably 0.5 day to 1 day. When the temperature is about 80 degree C., the time is preferably 0.1 hour to 8 hours, more preferably 0.5 hour to 4 hours.

Another aspect of this invention is a method comprises the step of: contacting a surface of a material with a free radical initiator solution prior to contacting with the solution comprising (A) and (B). It is known that catechol oxidizes enzymes, present in mussels-adhesive-protein secretions, convert the dihydroxyphenyl group of DOPA into highly reactive o-quinone functionalities. Michael Addition of side-chain amino groups from lysine residues to DOPA-quinone residues can be expected. There are also chances to generate free radical o-semiquinones by half oxidization of dihydroxyphenyl groups. It is expected that free radical species might build covalent bonds between o-semiquinones to increase cohesion (cross-links) and enable coupling to organic materials to enhance interfacial adhesion (adhesive reaction).

The inventors found that the steps of contacting a surface of a material with a free radical initiator solution prior to contacting with the solution comprising (A) and (B) increases the electroless metal coverage on dielectric substrate such as glass fibers, which indicates that the adhesion between the dielectric substrate and the deposited metal film may be improved. As the temperature of the solution comprising (A) and (B) is increased from 20° C. to 80° C., the oxidization rate of hydroxyphenyl group increases greatly. When (B) is catechol, the generation of o-quinine becomes rapid, while the concentration of free radical o-semiquinone (half oxidized dihydroxyphenyl) may fall. Since free radicals are believed to play a key role in both adhesive (coupling) and cohesive (cross-link) reactions, lower levels of free radical may reduce improvements in adhesive strength. In order to gain higher electroless metal coverage and higher adhesion between dielectric substrate and deposited metal, a free radical initiator is introduced by contacting the material with an organic solution of free-radical initiator.

Preferable free radical initiators are organic-soluble free radical initiators with limited water-solubility, because such free radical initiators are compatible with the surface of the dielectric material and can remain on the surface after contacting with an aqueous solution comprising (A) and (B). Examples of such free radical initiators include, but are not limited to, 2,2'-Azobis(2-methylbutyronitrile), Dimethyl 2,2'-azobis(2-methylpropionate), AIBN (2,2-azobisisobutyronitrile), ADMVN (2,2'-Azobis(2,4-dimethyl)valeronitrile)), and 2,2'-Azobis(4-methoxy-2.4-dimethyl valeronitrile). Their structural formulae, CAS numbers, molecular weights, solubility, as well as 10 hour half life decomposition temperatures are listed in Table 1.

TABLE 1

Examples of organic soluble free radical initiators with limited water-solubility

| Chemical Name | Structure Formula | Solubility | 10 Hour half-life decomposition temperature |
|---|---|---|---|
| 2,2'-Azobis(2-methyl-butyronitrile) CAS NO. 13472-08-7 Molecular weight = 192.26 | $H_3CH_2C-\underset{\underset{CN}{\mid}}{\overset{\overset{CH_3}{\mid}}{C}}-N=N-\underset{\underset{CN}{\mid}}{\overset{\overset{CH_3}{\mid}}{C}}-CH_2CH_3$ | freely soluble in toluene, methanol, IPA or ethyl acetate insoluble in water | 67° C.(in toluene) |
| Dimethyl 2,2'-azobis(2-methyl-propionate) CAS NO. 2589-57-3 Molecular weight = 230.26 | $\underset{H_3CO}{\overset{O}{\diagdown}}\overset{}{C}-\underset{\underset{CH_3}{\mid}}{\overset{\overset{CH_3}{\mid}}{C}}-N=N-\underset{\underset{CH_3}{\mid}}{\overset{\overset{CH_3}{\mid}}{C}}-\overset{O}{\underset{OCH_3}{\diagup}}C$ | freely soluble in toluene, methanol, IPA or ethyl acetate very insoluble in water | 66° C.(in toluene) |
| 2,2'-Azobisisobutyronitrile (AIBN) CAS Number 78-67-1 Molecular weight 164.21 | $N\equiv C-\underset{\underset{H_3C}{\mid}}{\overset{\overset{H_3C\ \ CH_3}{\diagdown\ \ \diagup}}{C}}\underset{N}{\diagdown}\underset{\diagup}{\overset{}{N}}\underset{\underset{CH_3}{\mid}}{\overset{}{C}}-C\equiv N$ | soluble in methanol and ethanol, but is insoluble in water | 65° C.(in toluene) |
| 2,2'-Azobis(2.4-dimethyl valeronitrile) (ADMVN) CAS NO. 4419-11-8 Molecular weight = 248.37 | $H_3CH_2C-\underset{\underset{CN}{\mid}}{\overset{\overset{CH_3}{\mid}}{C}}-N=N-\underset{\underset{CN}{\mid}}{\overset{\overset{CH_3}{\mid}}{C}}-CH_2CH_3$ | soluble in toluene, methanol, acetone, or styrene insoluble in water | 51° C.(in toluene) |
| 2,2'-Azobis(4-methoxy-2.4-dimethyl valeronitrile) CAS NO. 15545-97-8 Molecular weight = 308.42 | $H_3CCH_2C-\underset{\underset{H_3C}{\mid}}{\overset{\overset{H_3CO\ \ CH_3}{\mid\ \ \ \ \ \ \mid}}{C}}-N=N-\underset{\underset{CH_3}{\mid}}{\overset{\overset{CH_3\ \ OCH_3}{\mid\ \ \ \ \ \mid}}{C}}-CH_2CCH_3$ | soluble in toluene or acetone very slightly soluble in methanol insoluble in water | 30° C.(in toluene) |

Preferable medium of the solution is an organic solvent such as toluene, PGMEA (propylene glycol monomethyl ether acetate), IPA (isopropyl alcohol), ethyl acetate, acetone, or methanol, depending on the specific free radical initiator selected.

The concentration of the free radical initiator solution is preferably 0.003 to 0.3 mol/L, more preferably 0.02 to 0.2 mol/L. The temperature of contacting a material with the free radical initiator solution is, preferably −10 to 40 degree C., more preferably, around room temperature. The time of contacting a material with the free radical initiator solution is preferably 0.1 second to 0.5 hour, more preferably, 3 seconds to 3 minutes.

When contacting a material with a free radical initiator solution prior to contacting with the solution comprising (A) and (B), the conditions of the following step should match with the kind of free radical initiator so that the temperature and dwell time of contacting with the solution comprising (A) and (B) should be determined from the half-life of each initiator. For example, if AIBN is used as a free radical initiator followed by the step of contacting with the solution comprising (A) and (B), the temperature and dwell time of the following step matches at 80 degree C. for 2 to 4 hours, but if ADMVN is used, it should be carried out at 65 degree C. for 2 to 4 hours.

A further aspect of this invention is a method for forming a metallic film on a non-conductive surface of a material, which comprises the following steps;

Step 1 contacting a surface of a material with a solution comprising (A) and (B) described above, Step 2 conducting electroless metal plating of the material surface.

Step 1 has been described above, so the description is incorporated here. As described before, the step of contacting with a free radical initiator can be conducted before step 1.

Between the step 1 and step 2, a step for applying a catalyst solution may be conducted. Conventional catalysts can be used for this step, such as Pd/Sn colloid or ionic catalysts containing Pd or Ag ions. For the condition of applying the catalyst solution, such as concentration, temperature and time, conventional technologies could be applied. For example, CATAPOSIT™ 44 Catalyst (Pd/Sn colloidal catalyst) in combination with CATAPREP™ 404 Pre-dip (protection salt for Pd/Sn catalyst) commercially available from Dow Electronics Materials can be used. For example, a material is dipped in 270 g/L of CATAPREP™ 404 Pre-dip aqueous bath at 20 to 35 degree C. for 0.5 to 3.0 minutes to protect the catalyst from harmful drag-in. The material is then dipped in an aqueous solution containing 15 to 30 mL/L CATAPOSIT™ 44 Catalyst and 270 g/L of CATAPREP™ 404 Pre-dip at 32 to 52 degree C. for 4 to 5 minutes.

The necessity for a catalyst step depends on the electroless plating bath used for the metallization. For example, an electroless plating bath including chelating agent, reducing agent, acid/base/pH adjuster, a less strong chelating agent together with a stronger reducing agent may allow electroless plating without the use of a catalyst step. Therefore, if a plating process without a catalyzing step is adopted, (A) and (B) should be selected so that the polymerized film has high reductibility as mentioned above.

Step 2 is an electroless metal plating step on the surface of a material on which a polymerized film has been formed. The surface of the material is electrolessly plated with one or more metallic layers, such as copper, using an electroless metal plating bath. Conventional electroless metal plating baths may be used. Such baths are well known in the art. Metals which may be deposited on the surface of the material include, but are not limited to, copper, nickel, gold, silver and copper/nickel alloys. Preferably, nickel or copper is deposited on the surface of the materials. For example, CIRCUPOSIT™ 880 ELECTROLESS COPPER, CUPOSIT™ 253 ELECTROLESS COPPER, CIRCUPOSIT™ 3350 ELECTROLESS COPPER all commercially available from Dow Electronics Material can be used. Conventional electroless processes may be applied. For example, when a copper electroless plating bath is used, a material is dipped in an electroless plating bath including 45 mL/L CIRCUPOSIT™ 880 E, 10 mL/L CIRCUPOSIT™ 880 A, 28 mL/L CUPOSIT™ Z, 25 mL/L CIRCUPOSIT™ 880 C, and 15 mL/L CUPOSIT™ Y at 30 to 34 degree C. for 15 to 45 minutes.

After the electroless plating step, the material may undergo further processing. Further processing may include additional electroless or electrolytic metal plating on the material, for example, copper, gold, silver, tin and alloys thereof. Conventional electrolytic metal bathes may be used. Such bathes are well known in the art.

After each step described above, the material is optionally rinsed with water.

The method of this invention provides good electroless metal coverage on treated surface and better adhesion between a non-conductive surface of a material and a deposited metallic film without the use of a traditional conditioner. While the mechanism of adhesion building up is not fully understood, it is believed that chemical bonds, such as coordination bonds or covalent bonds, may be formed during the treatment disclosed by this invention, which contribute to the better adhesion results.

EXAMPLES

The present invention may be better understood from the examples that follow. The examples are shown for illustration purposes only, and are not intended to limit the invention in any way. In the following examples, the pH of dopamine solution is buffered with 0.010 mol/L tris(hydroxymethyl)aminomethane and HCl, and the pH of aqueous solution of monomer pairs is either buffered with $K_2HPO_4$/Citric Acid in the pH range of 3.0 to 8.0, or with $H_3BO_3$/KCl/NaOH in the pH range of 8.0 to 10.0.

Examples 1-12

Examples 1 to 12 provide some monomer-pair examples that are capable of in-situ polymerization in an aqueous solution and are capable of forming a water insoluble copolymer(A+B) film on a dielectric substrate. These copolymer(A+B) films show conditioner functionality, which increase the electroless copper coverage on glass cloth coupons without the use of a traditional conditioner.

Example 1

(1) Pretreatment

Glass cloth coupons were obtained from glass-fiber reinforced bare epoxy laminates S1141 (Size: 50 mm*150 mm*1 mm, Supplier: Shengyi Technology Co. Ltd., Glass transition temperature: 140~150 degree C., Abbreviated as bare laminates). The bare laminate coupons were first immersed in 98% $H_2SO_4$ for 1 day to dissolve the epoxy resin and expose the glass cloth, then water rinsed for 5 minutes to clean the surface of glass cloth. This treatment was then repeated at least once to minimize epoxy residues. After final rinsing, the glass cloth coupons were oven dried at 120° C. for 4 hours.

(2) Free Radical Initiator Treatment

The dried glass cloth coupon was contacted with a free radical initiator solution. The glass coupon was dipped in a free radical initiator solution comprising 0.2 mol/L of AIBN (Azobisisobutyronitrile) in toluene at room temperature for 1 minute, and then dried in a fume hood at room temperature for 5 minutes.

(3) (A)+(B) Solution Treatment

Next, the glass cloth coupon was contacted with a solution comprising (A) and (B). A solution comprising 0.026 mol/L of hexamethylene diamine and 0.013 mol/L of catechol was prepared using a $K_2HPO_4$/Citric Acid buffer solution. The pH of the solution was 4.5. The glass cloth coupon was then dipped in the above described aqueous solution at 80 degree C. for 4 hours. A water insoluble copolymer(A+B) film was formed on the surface of the treated glass cloth coupon.

(4) Electroless Plating without a Traditional Conditioner Step

Next, the treated glass cloth coupon with the copolymer (A+B) film was treated in an electroless copper plating process without a traditional conditioner step. The coupon was dipped in a Microetch bath at room temperature for 1 minute, which contained 50 g/L of PREPOSIT™ Etch 748 (Dow Electronics Materials) and 20 mL/L 98% $H_2SO_4$ (Sigma-Aldrich), and then rinsed with R.O. water for 3 minutes. After that, the coupon was dipped in 270 g/L of CATAPREP™ 404 PreDip (Dow Electronics Materials) at 23 degree C. for 1 minute. Next, the glass cloth coupon was dipped in a catalyst bath at 40 degree C. for 5 minutes, which contained 20 mL/L of CATAPOSIT™ 44 Catalyst concentrate (Dow Electronics Materials) and 270 g/L of CATAPREP™ 404 PreDip, and then rinsed with R.O. Water for 2 minutes. Next, the coupon was dipped in a CIRCUPOSIT™ 880 Electroless Copper bath (Dow Electronics Materials) at 34 degree C. for 30 to 45 minutes, which was prepared using 45 mL/L CIRCUPOSIT™ 880 E, 10 mL/L CIRCUPOSIT™ 880 A, 28 mL/L CUPOSIT™ Z, 25 mL/L CIRCUPOSIT™ 880 C, and 15 mL/L CUPOSIT™ Y. After that, the glass cloth coupon was rinsed with R.O. water for 3 minutes and dried with an air knife for 2 minutes. A uniform electroless copper film was formed on the surface of the glass cloth coupon without the use of a traditional conditioner.

Examples 2-8

Examples 2 to 8 were processed in the same way as Example 1, except that the monomer pairs ((A)+(B)) and the mole ratio between them within procedure (3) were changed as indicated in Table 2. The basic concentration was 0.013 mol/L. By multiplying the basic concentration 0.013 mol/L by the mole ratio of the indicated monomer shown in table 2, the initial concentration of that monomer in the treatment bath was obtained. In all examples, a water insoluble copolymer(A+B) film was formed on the surface of glass cloth coupon after the "(A)+(B) solution treatment", and an electroless copper plated film was formed after electroless plating without a traditional conditioner step.

Examples 9, 10

Examples 9 and10 were processed in the same way as Example 1, except that the chemicals, the mole ratio between them, treatment temperature and dwell time of treatment within procedure (3) were changed as indicated in Table 2 and step (2) was not conducted. The basic concentration was 0.013 mol/L. By multiplying the basic concentration 0.013 mol/L by the mole ratio of the indicated monomer shown in Table 2, the initial concentration of that monomer in the treatment bath was obtained. A water insoluble copolymer(A+B) film was formed on the surface of glass cloth coupon after the "(A)+(B) solution treatment", and an electroless copper plated film was formed after electroless plating without a traditional conditioner step.

Example 11

Example 11 is a blank control of Example 1 to 8. It was processed in the same way as Example 1, except that step (2) was conducted using toluene without the presence of any free radical initiator, and step (3) was conducted using distilled water alone, without any solute. Only a very small amount of electroless copper was deposited on the surface of the glass cloth coupon after electroless plating without a traditional conditioner step. No continuous film of electroless copper film was formed.

Example 12

Example 12 is a blank control of Example 9 and 10. It was processed in the same way as Example 9 and 10, except that step (3) was conducted using distilled water alone, without any solute. Only a very small amount of electroless copper was deposited on the surface of the glass cloth coupon after electroless plating without a traditional conditioner step. No continuous film of electroless copper film was formed.

TABLE 2

| Ex. No. | (A) + (B) | Dip in 0.2 mol/L AIBN Toluene Solution | Dip in an aqueous solution of (A) + (B) Time & Temp | pH | Mole Ratio | Copolymer(A + B) film formed on the surface of glass cloth coupons | Electroless Cu film formed on the surface of glass cloth coupons without the use of a traditional conditioner |
|---|---|---|---|---|---|---|---|
| 1 2 | 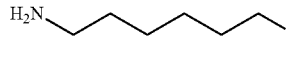 | 1 min @ RT | 4 hours @ 80° C. | 4.5 3.5 | 2:1 1:1 | Yes | Yes |
| 3 | 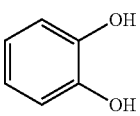 | 1 min @ RT | 4 hours @ 80° C. | 7.5~ 9.5 | 2:1 | Yes | Yes |
| 4 | 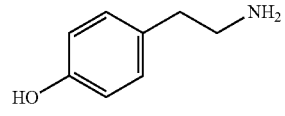 | 1 min @ RT | 4 hours @ 80° C. | 9 | 1:1:1 | Yes | Yes |

TABLE 2-continued

| Ex. No. | (A) + (B) | Dip in 0.2 mol/L AIBN Toluene Solution | Dip in an aqueous solution of (A) + (B) Time & Temp | pH | Mole Ratio | Copolymer(A + B) film formed on the surface of glass cloth coupons | Electroless Cu film formed on the surface of glass cloth coupons without the use of a traditional conditioner |
|---|---|---|---|---|---|---|---|
| 5 | 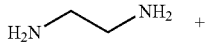 | 1 min @ RT | 4 hours @ 80° C. | 8 | 1:1 | Yes | Yes |
| 6 | 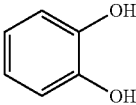 | 1 min @ RT | 4 hours @ 80° C. | 9 | 1:1:1 | Yes | Yes |
| 7 | 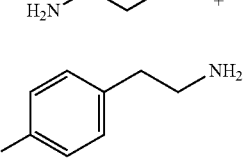 | 1 min @ RT | 4 hours @ 80° C. | 8 | 1:1 | Yes | Yes |
| 8 | 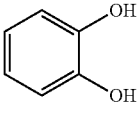 | 1 min @ RT | 4 hours @ 80° C. | 8 | 1:1 | Yes | Yes |
| 9 | 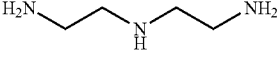 | — | 24 hours @ RT | 9 | 1:1 | Yes | Yes |
| 10 | 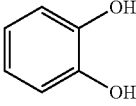 <control> | — | 24 hours @ RT | 8.5 | 1 | Yes | Yes |

TABLE 2-continued

| Ex. No. | (A) + (B) | Dip in 0.2 mol/L AIBN Toluene Solution | Dip in an aqueous solution of (A) + (B) | | | Copolymer(A + B) film formed on the surface of glass cloth coupons | Electroless Cu film formed on the surface of glass cloth coupons without the use of a traditional conditioner |
| --- | --- | --- | --- | --- | --- | --- | --- |
| | | | Time & Temp | pH | Mole Ratio | | |
| 11 | Blank control after 4 hour 80° C. distilled water treatment | — | — | 7.0 | — | No | No |
| 12 | Blank control after 24 hour RT distilled water treatment | — | — | 7.0 | — | No | No |

From Examples 1 to 12, it can be seen that all the examples 1 thru 9 monomer pairs ((A)+(B)) were capable of polymerization in an aqueous solution to form a water insoluble polymer film, similar to the behavior of dopamine. Almost no electroless copper can be deposited on a glass cloth coupon without the aid of a traditional conditioner. Only the formation of a very light-pink color with partial coverage is observed for the blank control glass cloth coupon after electroless copper plating (Example 11, 12). Monomer-pair treated or dopamine treated glass cloth coupons show a uniform bright salmon pink appearance indicating continuous copper deposit after electroless copper plating without the aid of a traditional conditioner. It can be said that the copolymer(A+B) films formed by examples 1 thru 9 monomer pairs ((A)+(B)), as well as the polydopamine film formed by dopamine at room temperature, show conditioner functionality. They are capable of increasing copper coverage on glass cloth coupons without the use of a traditional conditioner.

Examples 13-17

There are two aims for Examples 13 to 17. One aim was to compare the conditioner functionality of monomer pair treatment with that of dopamine treatment at 80 degree C. for 2 to 4 hours, by the back light test. The other aim was to examine the benefit of free radical initiator treatment to the conditioner functionality of monomer pair treatment.

By visually checking the coverage of electroless copper on glass cloth coupons, the conditioner functionality of in-situ polymerization film was assessed more directly and more conveniently. A quantitative measurement of electroless copper coverage was a back light test, which measures the degree of electroless copper coverage in plated through holes, which contain areas of resin, glass fiber tips, and transverse glass fibers.

The back light test was carried out on small sections cut from drilled laminates, containing a number of holes, aligned along the same axis. The diameter of the holes chosen was 1 millimeter. Once the drilled laminates have been processed through the electroless copper plating process, the holes to be evaluated were extracted with a diamond saw. The holes were cut as close as possible to their center axis, while ensuring the holes were free of burrs or other debris and that the thickness of the coupon (from back surface to the middle of the holes) was less than 3 mm to allow light transmission through the sample to allow light to penetrate for the back light test. An optical microscope capable of 50 to 1500 magnifications was used to carry out the back light test. Each of the holes was individually assessed by comparing with a series of standard images shown in FIG. 1.

Transmitted light was visible in any areas within the holes where there was incomplete electroless copper coverage. A numerical scale of 0.0~5.0 was used as back light ratings, where 5.0 represents a completely copper coverage on both resin areas and glass fiber areas. Back light ratings equal to or above 4.5 represent substantially complete copper coverage on resin and glass fiber areas. Only occasional glass tip voids were observed. Back light ratings equal to or above 4.0 indicated that the majority of resin and glass fiber areas had copper coverage, but voids were found on some glass tip areas and sometimes on transverse glass fiber areas. A back light rating ranging from 2 to 3.5 represented good copper coverage on resin areas, but poor copper coverage on glass areas (both glass tip and transverse glass fiber area). A back light rating lower than 2 means minimal copper coverage was found either on resin areas or on glass fiber areas. The back light ratings shown in this invention were the average of the values for 10 holes.

Example 13

(1) Pretreatment

Glass cloth coupons same as in Example 1 were used as samples for film formation test and electroless copper coverage tests, and copper clad laminate S1141 with 1 mm diameter drilled holes (Size: 35 mm*100 mm*2 mm, 20 holes per coupon, Shengyi Technology Co. Ltd., glass transition temperature: 140 to 150 degree C., abbreviated as drilled laminates) were used as samples for back light tests. Drill laminates were processed through the de-smear process shown below, which included a sweller, an oxidation, and a neutralizer bath treatment. Glass cloth coupons were not treated in the de-smear process.

The drill laminates were dipped in a sweller bath at 75 degree C. for 5 minutes, which contained 125 mL/L CIRCUPOSIT™ MLB Conditioner 211 (Dow Electronics Materials) and 115 mL/L CUPOSIT™ Z (Dow Electronics Materials), and then rinsed with R.O. water for 3 minutes. The drilled laminates were then dipped in an Oxidation bath at 80 degree C. for 8 minutes, which contained 150 mL/L CUPOSIT™ Z (Dow Electronics Materials) and 100 mL/L of CIRCUPOSIT™ MLB Promoter 213 (Dow Electronics Materials), and then rinsed with R.O. water for 3 minutes. After that, the drilled laminates were dipped in 50 mL/L of CIRCUPOSIT™ MLB Neutralizer 216-5 bath (Dow Electronics Materials) at 40 degree C. for 5 minutes followed by water rinse for 3 minutes. The drilled laminates were then dried with an air knife for 2 minutes.

(2) Free Radical Initiator Treatment

The dried glass cloth coupons as well as the de-smeared drilled laminates were treated in the same free radical initiator treatment as Example 1. The test sample was dipped in a free radical initiator solution comprising 0.2 mol/L of AIBN in toluene at room temperature for 1 minute. The sample was then dried in a fume hood at room temperature for 5 minutes.

(3) (A)+(B) Solution Treatment

Both the glass cloth coupons and the drilled laminates were contacted with a solution comprising (A) and (B) above. As indicated in Table 3, the solution comprising 0.026 mol/L of hexamethylene diamine and 0.013 mol/L of catechol was prepared using a $K_2HPO_4$/Citric Acid buffer solution. The pH of the solution was 4.5. The samples were dipped in the aqueous solution described above at 80 degree C. for 2 to 4 hours. A water insoluble copolymer(A+B) film was formed on the surface of the samples.

(4) Electroless Copper Plating without a Traditional Conditioner Step

Both the glass cloth coupons and the drilled laminates were processed through the same electroless copper plating process as Example 1.

(5) Back Light Test

After electroless copper plating, drilled laminates samples were cut by diamond saw as described in the previous section. The back light test was carried out on ten holes per sample with 1 mm diameter using a Leica DM6000 light microscope with a magnification: 50×. The back light ratings shown in Table 3 were the average of the values for 10 holes.

Example 14

Example 14 was processed in the same way as Example 13 except that step (2) was conducted in toluene without the presence of any free radical initiator.

Example 15

Example 15 was a dopamine control example with free radical treatment. It was processed in the same way as for Example 13, except that step (3) was conducted using 0.013 mol/L dopamine aqueous solution buffered with 0.010 mol/L tris(hydroxymethyl)aminomethane and HCl to pH 8.5.

Example 16

Example 16 was a dopamine control example without free radical treatment. It was processed in the same way as for Example 13 except that step (2) was conducted in toluene without the presence of any free radical initiator, and step (3) was conducted using 0.013 mol/L dopamine aqueous solution buffered with 0.010 mol/L tris(hydroxymethyl)aminomethane and HCl to pH 8.5.

Example 17

Example 17 was a blank control for Example 13 to 16. It was processed in the same way as for Example 13 except that step (2) was conducted in toluene without the presence of any free radical initiator, and step (3) was conducted in distilled water alone, without any solute.

TABLE 3

| Ex. No. | Free Radical Initiator treatment | Dip in an aqueous solution of below listed solutes @ 80° C. for 2~4 hours | Copolymer(A + B) film formed on the surface of glass cloth coupons | Electroless Cu film formed on the surface of glass cloth coupons without the use of a traditional conditioner | Black Light Rating (Electroless Cu coverage, Highest rating is 5.0) |
|---|---|---|---|---|---|
| 13 | With | (A) 0.026 mol/L 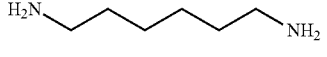 + (B) 0.013 mol/L 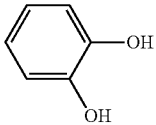 | Yes | Yes | 4.8 |
| 14 | Without | @ pH 4.5 | Yes | Yes | 4.0 |
| 15 | With | 0.013 mol/L 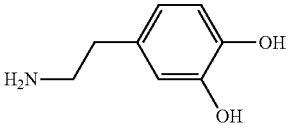 | Yes | No | 3.1 |
| 16 | Without | @ pH 8.5 | Yes | No | 3.1 |
| 17 | Without | Blank Control: Distilled water @ pH 7 | No | No | 3.0 |

Comparing Example 14 with 17, it can be seen that good copper coverage was only obtained both on glass cloth coupons and in the through holes of drilled laminates that were treated by a monomer pair (HMDA/Catechol) at 80 degree C. for 2~4 hours without free radical initiator.

Comparing Example 14 with 13, It can be seen that even better copper coverage was obtained in the through holes of drilled laminates that were treated by the same monomer pair (HMDA/Catechol) at the same temperature (80 degree C.) for the same duration (2~4 hours) with free radical initiator treatment.

Example 15 and 16 indicated that poor copper coverage was observed on glass cloth coupons and in the through holes of drilled laminates that were treated by dopamine at 80 degree C. for 2~4 hours, whether with or without free radical treatment, although there was visible polydopamine film formed on the surface of treated sample. Compared with Example 10 shown in Table 2, the formation temperature of polydopamine affected its conditioner functionality. At room temperature for 24 hours, the polydopamine film formed showed good conditioner functionality. At 80 degree C. for 2~4 hours, the polydopamine film did not show conditioner functionality, although its appearance was similar to that formed at room temperature for 24 hours. A possible explanation to this phenomenon was that the priority of reactions may have changed with an increase of the treatment temperature. At higher temperatures, a higher rate of oxidation reaction was observed, and a higher rate of Michael Addition reaction was assumed. Under these conditions, more consumption of amine groups was expected, leaving less amine group residues on the surface of polydopamine film, resulting in weaker conditioner function.

Examples 18-25

Examples 18 to 25 were proceeded to examine the multiple functionalities of the copolymer(A+B) film formed by monomer pairs ((A)+(B)) treatment, including the conditioner functionality and the adhesion promoter functionality by Back Light Test and Peel Strength Test.

Peel Strength Test was conducted on the test coupons using the following conditions:
Equipment: Peel strength tester, Type: Ceco TA 631E
Peel speed: 2 inch/minutes
Width of the copper strip: 10 millimeter
Length of the copper strip: 100 millimeter
Thickness of the copper strip: 34 micron to 38 micron
Testing time per strip: 80 second
Peel strength data for one strip: the average of the peel strength values during 15 second to 75 second
Peel strength data shown in this invention: the average of the peel strength data obtained from 8~10 strips Examples 18-20

(1) Pretreatment
Drilled laminates S1141 the same as Example 13 were used as samples for back light test, and glass-fiber reinforced bare epoxy laminates S1141 (Size: 50 mm*150 mm*1 mm, Supplier: Shengyi Technology Co. Ltd., Glass transition temperature: 140 to 150 degree C., Abbreviated as bare laminates S1141) were used as test samples for peel strength between dielectric substrate and deposited metal film.

Bare laminates S1141 and drilled laminates S1141 were processed through the same de-smear process described in Example 13.

(2) Free Radical Initiator Treatment
De-smeared bare laminates S1141 and de-smeared drilled laminates S1141 were processed through the same free radical initiator treatment process described in Example 13.

(3) (A)+(B) Solution Treatment
Next, the sample was processed through the step of contacting with a solution comprising (A) and (B) above. In these experiments, (A) is hexamethylene diamine and (B) is catechol. The basic concentration was 0.013 mol/L. By multiplying the basic concentration 0.013 mol/L by the mole ratio of the indicated monomer shown in table 4, the initial concentration of that monomer in the treatment bath was obtained. The sample was treated at 80 degree C. for 2 to 4 hours. A water insoluble film was formed on the surface of treated samples.

(4) Electroless Plating without a Traditional Conditioner Step
After (A)+(B) solution treatment, the bare laminates S1141 and drilled laminates S1141 were processed through the same electroless plating process without a traditional conditioner step described in Example 13.

(5) Back Light Test
After electroless plating, the drilled laminates S1141 were examined using the same back light test process as Example 13.

(6) Electrolytic Plating
The samples of bare laminates S1141 with the electroless copper film were processed through an electrolytic copper plating process. The sample was first dipped in a acid cleaner bath at 40 degree C. for 5 minutes, which contained 50 mL/L RONACLEAN™ LP 200 ACIDIC CLEANER (Dow Electronics Materials) and 50 mL/L 98% $H_2SO_4$ (Sigma-Aldrich). The sample was then rinsed with R.O. water for 3 minutes. After that, the sample was dipped in a 100 mL/L 98% $H_2SO_4$ aqueous solution at 23 degree C. for 1 minute. Electrolytic plating was then performed in an aqueous solution comprising 75 g/L copper ion from $CuSO_4$, 100 mL/L 98% $H_2SO_4$ (Sigma-Aldrich), 60 ppm chloride ion from 1 mol/L HCl (Sigma-Aldrich), 10 mL/L COPPER GLEAM™ 125T-AB Part B and 5 mL/L COPPER GLEAM™ 125T-AB Part A, at 20 ampere per square feet for 80 minutes.

(7) Baking
Next, the electrolytic plated sample was baked at 160 degree C. for 60 minutes before the peel strength test.

Example 21

Example 21 was a blank control for Examples 18 to 20. It was processed in the same way as Example 18-20, except that step (2) was conducted in toluene without the presence of any free radical initiator, and step (3) was conducted in distilled water alone, without any solute.

Examples 22-24

Examples 22 to 24 were processed in the same way as Example 18-20 except that peel strength test was performed on another type of dielectric substrate, ABF-GX-13 film applied to a laminate substrate (Size: 100 mm*100 mm, Supplier: Ajinomoto fine-techno Co., Inc,), and that no back light tests were carried out.

Example 25

Example 25 was a blank control for Examples 22 to 24. It was processed in the same way as Example 22-24, except that step (2) was conducted in toluene without the presence of any free radical initiator, and step (3) was conducted in distilled water alone, without any solute.

TABLE 4

| | | | | | Black Light Rating (Electroless Cu coverage, Highest Rating is 5.0) | | |
|---|---|---|---|---|---|---|---|
| Ex. No. | Dip in 0.2 mol/L AIBN Toluene Solution | Time & Temp | Mole ratio of (A) to (B) | pH | | Peel strength (lb/in) | Dielectric substrates |
| 18 | 1 min @ RT | 2~4 hours @ 80° C. | 2:1 | 8.5 | 4.3 | 5.3 | S1141 (Ra <400 nm) |
| 19 | 1 min @ RT | | | 4.5 | 4.8 | 4.0 | |
| 20 | 1 min @ RT | | 1:1 | 3.5 | 4.6 | — | |
| 21 | — | — | — | — | 3.0 | 2.9 | |
| 22 | 1 min @ RT | 2~4 hours @ 80° C. | 2:1 | 8.5 | — | 2.6 | ABF-GX13 (Ra <200 nm) |
| 23 | 1 min @ RT | | | 4.5 | — | 3.3 | |
| 24 | 1 min @ RT | | 1:1 | 3.5 | — | 2.8 | |
| 25 | — | — | — | — | — | 2.0 | |

(A): H$_2$N—(CH$_2$)$_6$—NH$_2$ (B): catechol (benzene with two OH groups)

Figure 2:
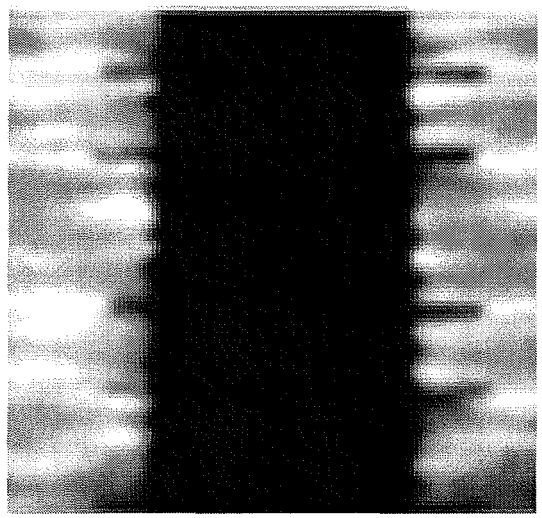
FIG. 2 is a photomicrograph of backlight test for Example 19.
Figure 3:
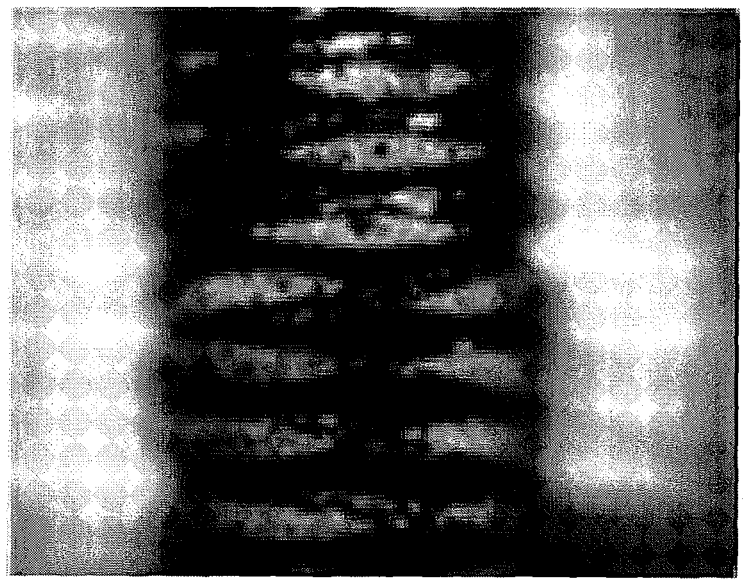
FIG. 3 is a photomicrograph of backlight test for Example 21.

It was observed that the through holes treated with the solutions of Example 18-20 (FIG. 2—Example 19) showed much better electroless copper coverage than untreated ones (FIG. 3—Example 21), and coupons treated with a solution comprising hexamethylene diamine and catechol (either S1141—Example 18-20 or ABF-GX13—Example 22-24) showed much higher peel strength than the untreated ones (Example 20 or Example 25). The improvement in back light and peel strength varied with mole ratio of (A) to (B) and pH of treatment bath, which showed the performance may be tailored based on requirements.

What is claimed is:

1. A method for forming a metallic film on a surface of a material comprising:
   a) contacting the surface of the material with a solution comprising a free radical initiator;
   b) contacting the surface of the material with the free radical initiator with a solution consisting of (A) an amine compound selected from the group consisting of H$_2$N—R$_1$—NH$_2$  (formula 1a)

wherein R$_1$ is selected from the group consisting of C$_1$ to C$_{24}$ linear or branched alkylene and aromatic alkylene;

H$_2$N—R$_1$—NH—R$_2$—NH$_2$  (formula 2a)

wherein R$_1$ and R$_2$ are selected independently from the group consisting of C$_1$ to C$_{24}$ linear or branched alkylene and aromatic alkylene;

H$_2$N—R$_1$—NH—R$_2$—N(H)—R$_3$—NH$_2$  (formula 3a)

wherein R$_1$, R$_2$, and R$_3$ are selected independently from the group consisting of C$_1$ to C$_{20}$ linear or branched alkylene and aromatic alkylene;

$$H_2N-R_1-CH(R_3-NH_2)-R_2-NH_2 \quad \text{(formula 4a)}$$

wherein R$_1$, R$_2$, and R$_3$ are selected independently from the group consisting of C$_1$ to C$_{20}$ linear or branched alkylene and aromatic alkylene;

(formula 5a):
   H$_2$N—R$_1$, H$_2$N—R$_2$ bonded to N—R$_3$—N, with R$_4$—NH$_2$ and R$_5$—NH$_2$ wherein R$_1$, R$_2$, R$_3$, R$_4$, and R$_5$ are selected independently from the group consisting of C$_1$ to C$_{16}$ linear or branched alkylene and aromatic alkylene; and HO—C$_6$H$_4$—R$_6$  (formula 7a)

wherein R$_6$ is selected from the group consisting of

—(CH$_2$)$_2$—NH$_2$,  —CH(OH)—CH$_2$—NH$_2$,  and  2-imidazoline group and; (B) a compound having a formula:

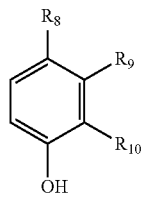

wherein $R_8$ is selected from the group consisting of H, $CH_3$, phenyl, CN, $NO_2$, propanoic acid, ethylamine, formic acid and formaldehyde, $R_9$ and $R_{10}$ are independently selected from the group consisting of H and OH; (C) a medium of the solution is selected from the group consisting of water Reverse Osmosis water and de-ionized water, and (D) a buffer selected from the group consisting of $K_2HPO_4$/citric acid and $H_3BO_3$/KCl/NaOH;
c) polymerizing the (A) compound and the (B) compound by Michael Addition on the surface of the material to form the polymerized film;
d) applying an electroless metal plating bath to the surface of the material comprising the polymerized film; and
e) conducting electroless metal plating on the material comprising the polymerized film.

2. The method according to claim 1, wherein a mole ratio of the functional groups within (A) to the functional groups within (B) is from 10:1 to 1:10.

* * * * *